United States Patent Office

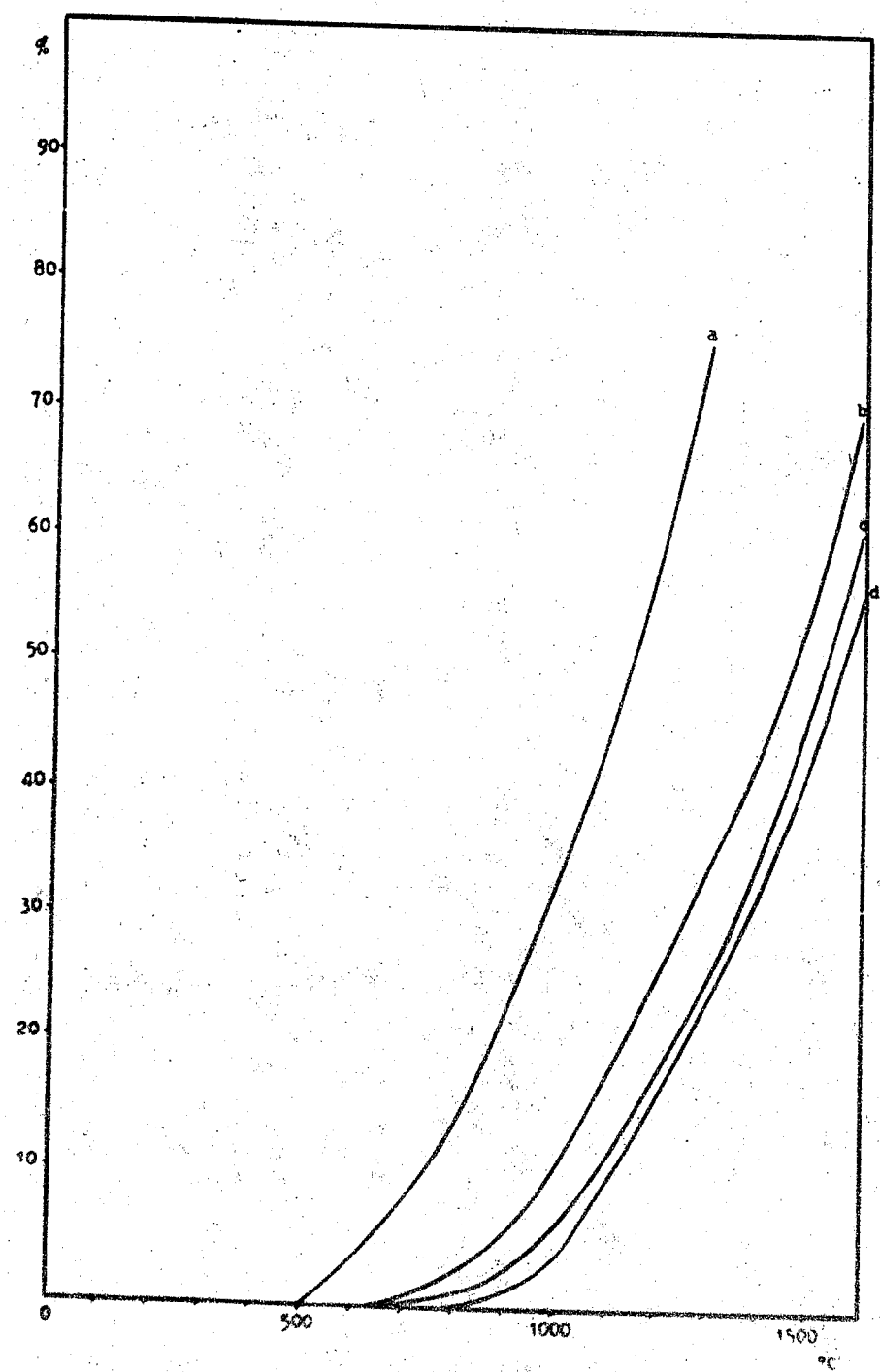

3,814,699
Patented June 4, 1974

3,814,699
SOLUTIONS FOR THE TREATMENT OF AMORPHOUS CARBON OR GRAPHITE MANUFACTURED ARTICLES FOR IMPROVING THEIR RESISTANCE TO OXIDATION
Francesco Baldieri and Carlo Borgianni, Rome, Italy, assignors to Snam Progetti S.p.A., Milanese, Italy
Filed Jan. 22, 1971, Ser. No. 108,739
Claims priority, application Italy, Jan. 22, 1970, 19,661/70
Int. Cl. C09k 3/00; B01j 1/16; B44d 1/20
U.S. Cl. 252—397
7 Claims

ABSTRACT OF THE DISCLOSURE

This invention provides a solution and novel procedure for imparting oxidation resistance to amorphous carbon or graphite manufactured articles by means of the coating solution which consists of water, phosphoric acid, one or more compounds selected from the groups of salts, oxides and hydroxides of a metal of the 2nd group of the periodic system; one or both components of the group formed by boric and sodium tetraborate decahydrate and one or more compounds selected from the group consisting of nitric acid, sodium nitrite and sodium carbonate.

---

The present invention refers to a process designed to give amorphous carbon or graphite manufactured articles greater resistance to oxidation at high temperature; reference is made, in addition, more particularly to a series of solutions designed to make the said manufactured articles more resistant to oxidation at high temperature, and to the said manufactured articles which are obtained by such processes and solutions. It is known that carbon materials—whether amorphous or crystalline—are, in view of their particular electric, mechanical and thermal properties, used in many types of industries as electrodes for furnaces in the iron and steel industry, or, again as electrodes, in the production of aluminum, or as refractories, crucibles, resistors, etc.

Despite their wide field of use, carbon materials have always found a limit in their easy oxidability at high temperatures.

Proposals have been made for coverings protecting the jackets on the surface of the manufactured article, with a base of silicons, polysiloxans, colloidal silica, carbides, nitrides and silicides of refractory metals, etc.; these systems are not the best, both because of the complexity of the operations and equipments required for the coating, and because the protective layer comes away fairly easily, and also owing to the addition of elements which are sometimes undesired, which may happen when manufactured articles protected in this way are used as electrodes or refractories in the iron and steel industry or in metallurgy in general.

Trials have also been made with impregnation with solutions having a phosphoric base, either alone or in combination with compounds such as ammonium phosphate, magnesium or zinc phosphate, chlorides of alkaline metals, sodium tetraborate, etc. But also these methods do not ensure good protection against oxidation except at relatively low temperatures.

The purpose of the present invention is to supply a process and solutions capable of making carbon or graphite manufactured articles resistant to the oxidation caused by air, molten metals, or other high temperature oxidating means, in a wider temperature range than that hitherto covered. Another purpose, equally important, of this invention is to supply carbon or graphite manufactured articles capable of resisting high temperature oxidation better than those so far known. The ways to achieve the above objectives and the advantages deriving from the present invention will be illustrated in the description given hereunder.

The objectives of the present invention are achieved by impregnating, or covering in some other way, the carbon or graphite manufactured articles, using a solution composed of:

water
phosphoric acid
one or more compounds selected in one or more of the groups formed by the salts, oxides, and hydroxides of a metal of the 2nd group of the periodic system
one or both the components of the group formed by boric acid and sodium tetraborate decahydrate
one or more compounds selected from among nitric acid, sodium nitrite, and sodium carbonate.

The advantages of using such a composition with regard to protection from oxidation will be evident in the examples which follow. Other immediate advantages of these solutions consist in not using hydrochloric acid as solvent and in providing for relatively low concentrations of phosphoric acid, thus making the preparation, handling and application of the solutions easier; furthermore the process selected for the preparation of the manufactured articles does not require their baking, so that it is simpler and more economical than other processes, which do require it.

According to the general idea of the present invention, the solutions inhibiting oxidation may have a percentage composition by weight varying within the ranges indicated below:

| | Percent |
|---|---|
| Water | 57.0–76.0 |
| One or more compounds selected from among the salts, oxides and hydroxides of a metal of the 2nd group | 0.1–6.0 |
| One or both the components of the group formed by sodium tetraborate decahydrate and boric acid | 16.9–2.0 |
| Phosphoric acid | 26.0–10.0 |
| One or more compounds selected from among nitric acid, sodium nitrite, and sodium carbonate | 0.0–6.0 |

A study of such solutions has shown that they can be divided into two groups, according to whether sodium tetraborate decahydrate or boric acid is used.

In the two cases the composition of the solutons can vary within the following limits, again expressed as a percentage composition by weight:

| | Percent |
|---|---|
| Water | 57.0–67.0 |
| Phosphoric acid | 20.0–16.0 |
| One or more compounds selected from among the salts, oxides and hydroxides of a metal of the 2nd group | 5.0–0.4 |
| Sodium tetraborate decahydrate | 12.0–16.6 |
| One or more compounds selected from among nitric acid, sodium nitrite, and sodium carbonate | 6.0–0.0 | or

| | Percent |
|---|---|
| Water | 70.0–76.0 |
| Phosphoric acid | 21.0–16.6 |
| One or more compounds selected from among the salts, oxides, and hydroxides of a metal of the 2nd group | 2.0–0.4 |
| Boric acid | 2.0–7.0 |
| One or more compounds selected from among nitric acid, sodium nitrite, and sodium carbonate | 5.0–0.0 |

The results obtained by using the solutions described in the present invention as protective solutions are set forth in the following examples.

EXAMPLE 1

A sample of graphite weighing 0.450 gr. taken from an Elettrocarbonium brand electrode diameter 350 mm. was placed in an emptiable container and subjected to degassing with a vacuum up to $5.10^{-3}$ mm. Hg; once the sample had been degassed, the impregnating solution was introduced into the container, still under vacuum, at a temperature of 70° C., so that it covered the sample; the pressure is raised to a maximum of 5 atmospheres. The sample, removed from the solution, was dried and seasoned at room pressure and temperature for about 48 hours.

The impregnating solution had the following percentage composition by weight:

|  | Percent |
|---|---|
| Water | 62.8 |
| Phosphoric acid | 18.0 |
| Calcium oxide | 0.4 |
| Sodium tetraborate decahydrate | 14.6 |
| Nitric acid | 2.9 |
| Sodium nitrate | 0.3 |
| Sodium carbonate | 1.0 |

To prepare the solution the phosphoric acid was first added to the water, then the calcium oxide was added, and then the sodium tetraborate decahydrate, until saturation at 70° C., and lastly all the other components.

The sample thus treated was subjected to oxidation reristance testing by means of a thermobalance, with air flow equal to 0.4 liters/h. and heating speed of 10° C./min., up to a maximum temperature of 1600° C. In this test the percentage decrease in the total weight of the sample was measured. The results were as follows:

| Temperature: | Total percentage decrease in weight |
|---|---|
| Up to 1000° C. | 8.2 |
| Up to 1250° C. | 22.8 |
| Up to 1400° C. | 39.2 |
| Up to 1600° C. | 63.8 |

EXAMPLE 2

A sample having the same characteristics as the one in example 1 and obtained from the same zone of the electrode was treated, on the basis of the technique described above, with a solution having the following composition by weight:

|  | Percent |
|---|---|
| Water | 62.8 |
| Phosphoric acid | 18.0 |
| Zinc oxide | 0.4 |
| Sodium tetraborate decahydrate | 14.6 |
| Nitric acid | 2.9 |
| Sodium nitrite | 0.3 |
| Sodium carbonate | 1.0 |

The solution was prepared in the way described in example 1. The thermobalance test, carried out with the same procedure as in example 1, gave the following results:

| Temperature: | Total percentage decrease in weight |
|---|---|
| Up to 1000° C. | 8.0 |
| Up to 1250° C. | 21.6 |
| Up to 1400° C. | 42.8 |
| Up to 1600° C. | 71.4 |

EXAMPLE 3

A sample having the same characteristics as the one in example 1 and obtained from the same zone of the electrode was treated, on the basis of the technique described above, with a solution having the following composition by weight:

|  | Percent |
|---|---|
| Water | 65.5 |
| Phosphoric acid | 18.8 |
| Calcium oxide | 0.4 |
| Sodium tetraborate decahydrate | 15.3 |

The thermobalance test, carried out with the same procedure as in example 1, gave the following results:

| Temperature: | Total percentage decrease in weight |
|---|---|
| Up to 1000° C. | 4.5 |
| Up to 1250° C. | 25.4 |
| Up to 1400° C. | 43.8 |
| Up to 1600° C. | 71.0 |

EXAMPLE 4

A sample having the same characteristics as the one in example 1 and obtained from the same zone of the electrode was treated, on the basis of the technique described above, with a solution having the following composition by weight:

|  | Percent |
|---|---|
| Water | 65.5 |
| Phosphoric acid | 18.8 |
| Cadmium oxide | 0.4 |
| Sodium tetraborate decahydrate | 15.3 |

The thermobalance test, carried out with the same procedure as in example 1, gave the following results:

| Temperature: | Total percentage decrease in weight |
|---|---|
| Up to 1000° C. | 6.8 |
| Up to 1250° C. | 20.4 |
| Up to 1400° C. | 37.8 |
| Up to 1600° C. | 65.2 |

EXAMPLE 5

A sample (sample D) of the type already used was treated, on the basis of the technique described above, with a solution having the following percentage composition by weight:

|  | Percent |
|---|---|
| Water | 74.2 |
| Phosphoric acid | 20.4 |
| Calcium oxide | 0.4 |
| Boric acid | 5.0 |

By means of the thermobalance test, carried out with the same procedure as in example 1, the following were determined:
 (a) Temperature of start of reaction
 (b) Speed of reaction expressed as percentage reduction in weight of the sample per ° C. (percent $°C.^{-1}$)
 (c) The total percentage decrease in weight of the sample up to the temperature t° C.

The results of the test are shown in tables 1 and 2.

EXAMPLE 6

A sample (sample C) of the type described above was treated, on the basis of the technique described above, with a solution having the following percentage composition by weight:

|  | Percent |
|---|---|
| Water | 64.8 |
| Phosphoric acid | 18.6 |
| Calcium oxide | 0.4 |
| Sodium tetraborate decahydrate | 15.1 |
| Sodium carbonate | 1.1 |

By means of the thermobalance test, the same determinations as in sample 5 were made. The results obtained are shown in tables 1 and 2.

In order to emphasize the advantages of the series of solutions covered by the present invention, a comparison was made between samples treated according to examples 5 and 6 and other samples, of which one not treated (sample A) and another treated with a solution and a method already known in technique (sample B). All the samples were of course obtained from the same zone of the same electrode.

A non-treated sample (sample A) was tested directly on the thermobalance, with the procedure set forth in example 1; the same determinations as in sample 5 were carried out. The results are shown in tables 1 and 2.

The other sample (sample B) was treated with the solution and the method which seem to have given the best results in known technique. Such solution has the following percentage composition by weight:

| | Percent |
|---|---|
| Water | 21.9 |
| Phosphoric acid | 63.3 |
| Zinc oxide | 13.8 |
| Boric acid | 1.0 |

The impregnation vessel containing the sample was degassed and then filled, still under vacuum, with the above solution. Impregnation under pressure was then carried out, with a maximum pressure of 5 atmospheres.

After impregnation the sample was dried and then subjected to desiccation at 105° C. and baking at 500° C.

The tests were then carried out with the thermobalance in accordance with example 5 and with the same procedure as in example 1. The results obtained are shown in tables 1 and 2.

TABLE 1

| | Sample | | | |
|---|---|---|---|---|
| | A | B | C | D |
| Temperature of start of reaction, °C. | 500 | 620 | 620 | 780 |
| Percent wt. decrease (percent° C.⁻¹): | | | | |
| 620/800° C | 0.075 | 0.009 | 0.010 | 0.000 |
| 800/900° C | 0.100 | 0.038 | 0.008 | 0.024 |
| 1,000/1,250° C | 0.143 | 0.073 | 0.054 | 0.054 |
| 1,300/1,400° C | 0.150 | 0.107 | 0.106 | 0.124 |
| 1,400/1,600° C | | 0.135 | 0.137 | 0.111 |

TABLE 2

| | Percent of— | | | |
|---|---|---|---|---|
| Sample | A | B | C | D |
| Total wt. percent decrease up to— | | | | |
| 1,000° C | 34.2 | 11.8 | 5.4 | 5.3 |
| 1,250° C | 68.2 | 30.0 | 19.1 | 18.8 |
| 1,400° C | 89.0 | 44.2 | 34.4 | 33.8 |
| 1,600° C | | 71.2 | 62.2 | 56.0 |

In order better to evidence the properties of the solutions covered by the present invention, other experiments were carried out, the results of which are shown hereunder.

Table 3 shows the percent losses in weight after a stay by the samples of 4 hours at the temperature °t.

The tests were made in a muffle with an air circulation obtained by natural draught and the samples, about 160 g., were placed in a magnesite crucible when the muffle had reached the working temperature.

The percentage increase in weight of the samples, due to impregnation, was always at least 5% after seasoning.

Tables 4 and 5 show the results obtained on the thermobalance when using the solution of example 5, but varying once the calcium oxide and once the phosphoric acid respectively, and maintaining the other components constant in order to demonstrate the importance of the composition of the solutions for purposes of good protection; it is found that the percentages used in the solution of example 5 are the most suitable ones.

TABLE 3.—PERCENTAGE LOSS AFTER 4 HOURS AT TEMPERATURE t° C.

| t° C | 900 | 1,200 | 1,400 |
|---|---|---|---|
| Non-treated graphite | 27 | 36 | 50 |
| Example No. 2 | 20 | 31 | 37 |
| Example No. 3 | 14 | 21 | 36 |
| Example No. 5 | 19 | 27 | 41 |
| Example No. 6 | 11 | 25 | 37 |

TABLE 4

| Percentage of calcium oxide | 0.1 | 0.4 | 1.8 |
|---|---|---|---|
| Total percent decrease in weight up to— | | | |
| 1,000° C | 9 | 5.3 | 9 |
| 1,250° C | 25 | 19 | 25 |
| 1,400° C | 44 | 34 | 45 |
| 1,600° C | 72 | 56 | 64 |

TABLE 5

| Percentage of phosphoric acid | 10.9 | 20.4 | 23 |
|---|---|---|---|
| Total percent decrease in weight up to— | | | |
| 1,000° C | 9 | 5.3 | 7 |
| 1,250° C | 25 | 19 | 22 |
| 1,400° C | 39 | 34 | 36 |
| 1,600° C | 63 | 56 | 60 |

The attached graph shows the results of some experiments which give a comparison between non-treated graphite (curve a); graphite treated with the solution already known to technique, and used in description after example 6 (curve b); graphite treated according to example 5 (curve c); graphite treated according to example 6 (curve d). The ordinates of the graph represent the percentage losses in weight of the sample when heated up to temperature t° C., as shown in the abscissae, with heating speed of 10° C./min. in air flow equal to 6.4 liters/h.

From the foregoing examples and comparisons it can be seen that there is a clear improvement in the properties of resistance to oxidation that the solutions proposed as new by the present invention are capable of giving to graphite or carbon bodies, as compared with the results which can be obtained with solutions already known in technique.

It should be borne in mind that, although the samples tested in the various experiments were all obtained from electrodes, the present invention refers to the treatment of any type of manufactured articles made from amorphous carbon or graphite, such for example as crucibles, refractory bricks, resistors and also materials treated with carbon products. Furthermore, although the examples have mentioned only one particular technique of impregnation, it is clear that the present invention also refers to any other technique of application (varnishing, immersion, etc.) of the solutions forming the subject of the present invention.

What we claim is:

1. Solution suitable for treatment of manufactured articles made of amorphous carbon or graphite, for the purpose of improving their resistance to oxidation, characterized by the fact of being formed essentially of: water; phosphoric acid; one or more compounds selected from the oxides and hydroxides of a metal of the 2nd group of the periodic system; one or both the components of the group formed by boric acid and sodium tetraborate decahydrate; one or more compounds selected from the group formed by nitric acid, sodium nitrite, and sodium carbonate; said constituents of the solution being mixed in accordance with percentage ratios by weight ranging between 57.0:26.0:0.1:16.9:0.0 and 76.0:10.0:6.0:2.0:6.0, respectively.

2. Solution in accordance with claim 1 in which the metal of the 2nd group of the Periodic System is calcium.

3. Solution in accordance with claim 1 in which the metal of the 2nd group of the Periodic System is cadmium.

4. Solution suitable for treatment of manufactured articles made of amorphous carbon or graphite, for the purpose of improving their resistance to oxidation, characterized by the fact of being formed essentially of: water; phosphoric acid; one or more components selected from the oxides and hydroxides of a metal of the 2nd group of the periodic system; sodium tetraborate decahydrate; one or more compounds selected from the group formed by nitric acid, sodium nitrite, sodium carbonate; said constituents of the solution being mixed in accordance with percentage ratios by weight ranging between 57.0:20.0: 5.0:12.0:6.0 and 67.0:16.0:0.4:16.6:0.0, respectively.

5. Solution suitable for treatment of manufactured articles made of amorphous carbon or graphite, for the purpose of improving their resistance to oxidation, characterized by the fact of being formed essentially of: water; phosphoric acid; one or more components selected from the oxides and hydroxides of a metal of the 2nd group of the Periodic System; boric acid; one or more compounds selected from the group formed by nitric acid, sodium nitrite, sodium carbonate; said constituents of the solution being mixed in accordance with percentage ratios by weight ranging between 70.0:21.0:2.0:2.0:5.0 and 76:0 16.6:0.4:7.0:0.0, respectively.

6. Solution suitable for treatment of manufactured articles made of amorphous carbon or graphite which consists essentially of water, phosphoric acid, calcium oxide and boric acid in accordance with percentage ratios by weight ranging between 57.0:26.0:0.1:16.9 and 76.0:10.0: 6.0:2.0; respectively.

7. Solution according to claim 6 which includes up to 6.0% of one or more compounds selected from the group consisting of nitric acid, sodium nitrite and sodium carbonate.

References Cited

UNITED STATES PATENTS

| | | | |
|---|---|---|---|
| 3,592,701 | 7/1971 | Pekar | 148—6.15 R |
| 2,500,673 | 3/1950 | Gibson | 148—6.15 Z |
| 1,610,362 | 12/1926 | Coslett | 148—6.15 Z |
| 2,964,434 | 12/1960 | Coleman | 148—6.15 R |
| 504,105 | 8/1893 | Corleis et al. | 117—228 |
| 3,553,010 | 1/1971 | Rubisch | 117—169 R |
| 3,288,655 | 11/1966 | Harwell et al. | 148—6.15 Z |

FOREIGN PATENTS

| | | | |
|---|---|---|---|
| 398,353 | 9/1933 | Great Britain | 148—6.15 Z |

CHARLES E. VAN HORN, Primary Examiner

T. E. BOKAN, Assistant Examiner

U.S. Cl. X.R.

13—18; 117—169 R, 222, 224, 228; 204—290 R, 294